Feb. 10, 1942.　　　F. O'KEANE　　　2,272,724
IMPLEMENT HITCH
Filed Aug. 4, 1940　　　2 Sheets-Sheet 1

Inventor
F. O'Keane

By

Attorneys

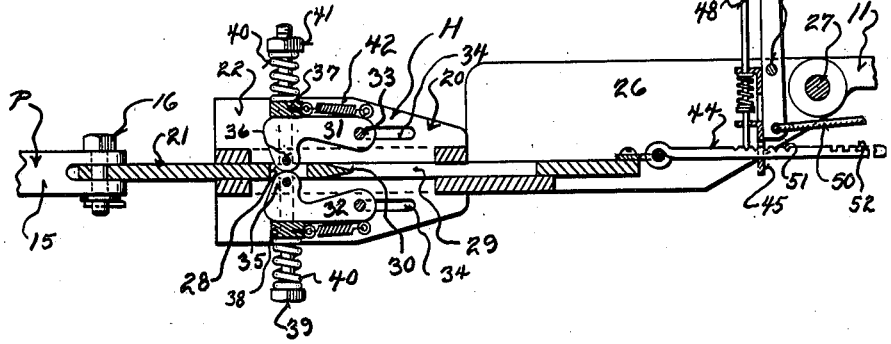
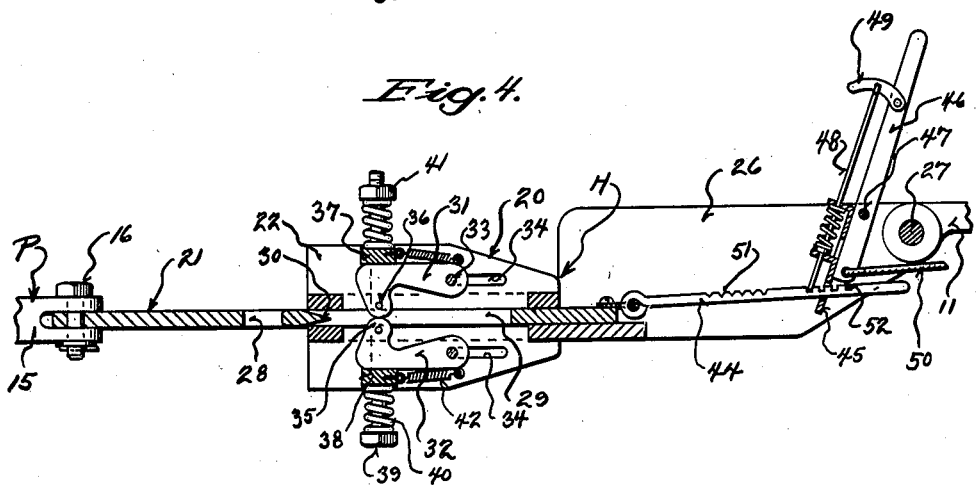
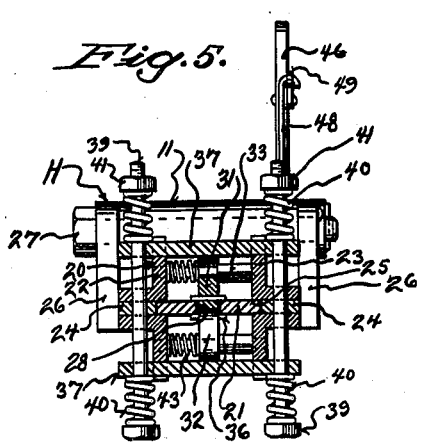

Patented Feb. 10, 1942

2,272,724

UNITED STATES PATENT OFFICE 2,272,724

IMPLEMENT HITCH

Francis O'Keane, Colgate, Wis.

Application August 4, 1940, Serial No. 351,408

3 Claims. (Cl. 180—14.5)

This invention appertains to hitches of the type employed for connecting farm implements, such as plows, to tractors.

One of the primary objects of my invention is to provide a hitch which will give or lengthen when an abnormal pull, such as when the plow strikes a root or rock, is exerted on the tractor drawbar, so as to prevent breakage of the plow point or injury to other parts of the equipment.

Another salient object of my invention is to provide a hitch which will effectively couple the plow and tractor under normal plowing conditions, but which will give when the plow strikes an obstruction, and which will automatically throw out the tractor clutch to bring about the stopping of the tractor, when the hitch parts have moved a certain distance relative to one another.

A further object of my invention is the provision of a pair of pivoted clamping jaws normally held in a clamping position with the implement pull bar by spring-pressed cross bars, the clamping jaws being movable to a released position against the tension of the cross bars when an obstruction is encountered.

A further important object of my invention is the provision of a longitudinally extending slot formed in the implement pull bar for receiving the clamping jaws after the clamping jaws have been forced out of their normal clamping position with the pull bar, the slot and jaws allowing a desired movement between the plow and tractor without the uncoupling of the plow and tractor, whereby to give the plow an opportunity to disengage itself from the encountered obstruction.

A still further object of my invention is the provision of means for actuating a hand lever by the pull bar when the clamping jaws ride into the slot, so that the lever can actuate the clutch pedal, the lever being manually releasable to allow the backing of the tractor, so that the hitch parts can resume their normal position.

With these and other objects in view, the invention consists in the novel construction, arrangement, and formation of parts, as will be hereinafter more specifically described, claimed, and illustrated in the accompanying drawings, in which drawings:

Figure 3 is a longitudinal sectional view through the hitch, taken on the line 3—3 of Figure 2, looking in the direction of the arrows, and showing the parts of the hitch under normal plowing conditions.

Figure 4 is a view similar to Figure 3, and showing the position of the parts after an abnormal pull has been exerted on the hitch.

Figure 5 is a transverse sectional view through the hitch, taken on the line 5—5 of Figure 2, looking in the direction of the arrows, illustrating the cross bars for normally holding the jaws against swinging movement.

Referring to the drawings in detail, wherein similar reference characters designate corresponding parts throughout the several views, the letter H generally indicates my improved hitch for connecting a tractor T with a plow P.

Figure 1:
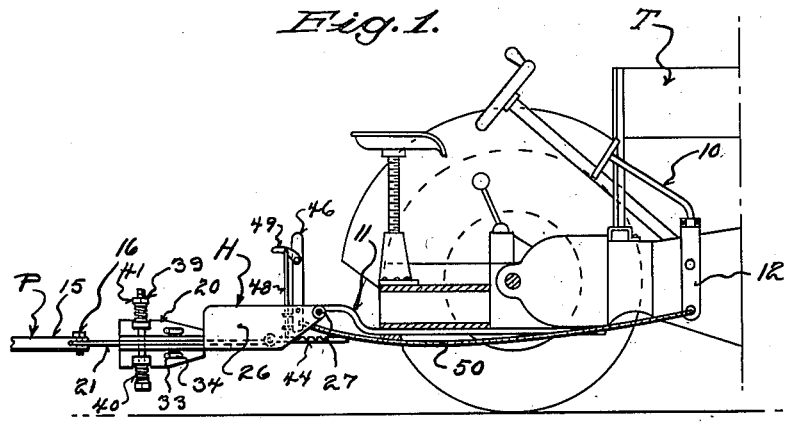
Figure 1 is a fragmentary, side, elevational view showing my novel hitch employed for connecting a plow to a tractor.
Figure 2:
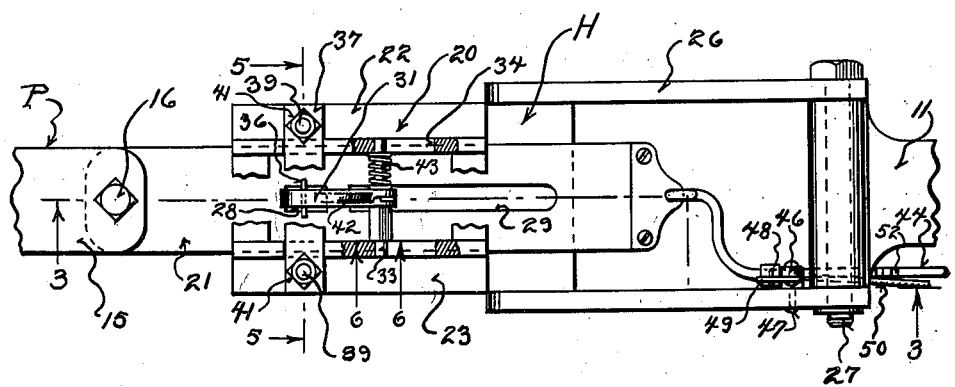
Figure 2 is a top plan view of the hitch, with parts broken away and in section.
Figure 6:
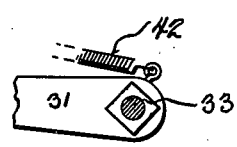
Figure 6 is a detail sectional view taken on the line 6—6 of Figure 2, looking in the direction of the arrows, illustrating the formation of one of the shafts for the jaws.

The tractor T can be of any preferred character or make and will not be described in detail, but the same includes a clutch pedal 10 and a drawbar 11. A clamp lever 12 is rigidly secured to the clutch pedal 10, for a purpose which will be hereinafter more fully set forth.

The plow P can be of any preferred character, and the same includes a plow beam 15, which may be provided with a clevis for connection with the hitch. As shown, a pin 16 is provided for connecting the beam with the hitch.

The hitch H includes a body 20 for slidably receiving the pull bar 21, which can be connected in any preferred manner with the implement being pulled, such as by the pin 16. The body 20 includes pairs of side angle bar strips 22 and 23, and these strips are held in spaced relation by filler plates 24, which are set inwardly from the inner faces of the angle strips 22 and 23. This forms a guideway 25 for the pull bar 21.

The forward ends of the filler plates 24 and the angle bar strips 22 and 23 are rigidly connected to forwardly extending, spaced, parallel, side plates 26, and these side plates are connected by a cross pivot bolt 27 with the drawbar 11 of the tractor.

From the description so far, it can be seen that the pull bar 21 is mounted for free sliding movement in the guide body 20.

In accordance with my invention, the pull bar 21 has formed therein an opening 28 and a longitudinally extending slot 29 directly in rear of said opening. The transverse wall of the slot 29, which is adjacent the opening 28, is tapered, as at 30, for a purpose which will be set forth later.

In order to normally prevent sliding movement of the pull bar 21 in the guide body 20, the guide body 20 has pivotally and slidably associated therewith upper and lower clamping jaws 31 and 32. The jaws at one end are provided with rock shafts 33, which are slidably and pivotally mounted in slots 34 formed in the angle bar strips 22 and 23. The ends of the jaws 31 and 32 which are remote from the rock shafts 33 have formed thereon inwardly extending noses 35, which normally extend into the opening 28. If preferred, the noses 35 can carry cross pins 36 for engaging the opposite faces of the pull bar 21, whereby to limit the inward swinging movement of the jaws.

In order to prevent free swinging movement of the jaws, the outer faces thereof are engaged by tension cross bars 37. The tension cross bars 37 are fitted within notches 38 formed in the outer edges of the pairs of angle bar strips 22 and 23. Guide bolts 39 extend through the horizontal flanges of the angle bar strips 22 and 23 and through the tension cross bars 37. Relatively heavy coil springs 40 are placed on the bolts and engage the outer faces of the cross bars 37. These springs 40 are held by the heads of the bolts and by nuts 41 adjustably threaded on said bolts.

Obviously, by adjusting the nuts, the tension of the springs 40 can be varied for varying the pressure of the engagement of the cross bars with the jaws 31 and 32. These jaws 31 and 32 are also held in their clamping position with the rock shafts 33 at the rear end of the slots 34 by comparatively light tension springs 42. These springs are connected to the jaws at one side of the rock shafts 33 and to the cross bars 37 and create a pull on the shafts 33 to normally hold the shafts 33 in the rear ends of the slots 34.

The rock shafts 33 are shouldered intermediate their ends, and the jaws 31 and 32 are held against the shoulders by means of expansion springs 43 coiled about the rock shafts. The ends of the springs engage the jaws 31 and 32 and the inner faces of the angle bar strips. These springs create desirable tension on the jaws for holding the jaws against the shoulders of the shafts and the shafts against accidental lateral shifting movement.

Pivotally connected to the pull bar 21 is the forwardly extending rod 44, and this rod is slidably and loosely received in a guide plate 45 carried by the lower end of a hand lever 46. This hand lever 46 is rockably mounted intermediate its ends on a pivot shaft 47 and carries a spring-pressed dog 48. This dog is manipulated through the means of a pivoted finger grip 49. The lower end of the hand lever 46 beyond its pivot 47 has connected therewith a pull cable 50, which leads toward and is secured to the clamp 12, which is connected to the foot clutch pedal.

The rod 44 adjacent its inner end is provided with a group of ratchet teeth 51, and the forward end thereof is provided with a group of square-shaped notches 52. When the parts are in normal position, as shown in Figure 3, the jaws 31 and 32 are disposed within the opening 28, and the dog 48 engages one of the ratchet teeth 51. Under normal plowing conditions, the clutch pedal 10 can be freely operated, as sufficient slack is left in the pull rope 50 to permit actuation of the pedal by the foot.

In use of my novel hitch, the tractor is manipulated in the ordinary manner, and the farming machine or implement is pulled in rear thereof. If a root or a tree or a rock is struck and an abnormal pull is exerted on the pull bar 21, the jaws 31 and 32 will be spread apart against the pressure of the cross bars 37 and 38, and, consequently, these jaws will ride out of the opening 28 and snap into the longitudinally extending slot 29. This desired movement should give the plow time and an opportunity to ride over the obstruction, but if the plow still is fastened against the obstruction and further movement is imparted to the pull bar 21, then the hand lever 46 will be rocked, causing a forcible pull on the rope or cable 50, which will be sufficient to depress the clutch pedal 10 and bring about the stopping of the tractor.

Upon the initial movement of the pull bar 21, the dog 58 can ratchet up and down on the group of teeth 51, but as soon as the dog strikes the abrupt notches 52, the dog will be held in the notches and the rod 44 will then rock the hand lever.

When the plow has passed over the obstruction it is merely necessary to back up the tractor and the tapered point 30 will spread the jaws 31 and 32 apart without undue effort, and allow the jaws to ride out of the slot 29 and into the opening 28. Thus, the hitch parts can be readily returned to their normal position without undue effort on the part of the operator of the tractor. To eliminate undue shock, the jaws are allowed to move forwardly against the tension of the springs 42, and when the jaws snap into the opening 28, the springs 42 will pull the jaws back to their normal position.

When the tractor is to be backed, the operator can merely reach back and operate the finger grip 49 on the hand lever 46 to raise the dog 48, which will permit the swinging of the hand lever to its upright position, so that the clutch can be manipulated in the ordinary way.

Changes in details may be made without departing from the spirit or the scope of my invention, but what I claim as new is:

1. A hitch for connecting a farm implement to a tractor comprising, a guide body, a pull bar slidably mounted in said body having an opening therein and a longitudinally extending slot directly in rear of said opening, said opening having abrupt walls, a pair of clamping jaws rockably mounted on said body adapted in one position of the pull bar to engage in the opening, and in another position of the pull bar to engage in the slot, means normally holding the jaws in the opening against swinging movement upon normal operation of the tractor and implement, said means being releasable upon an abnormal pull on the bar, whereby said jaws can separate and spring out of said opening and into the slot, said slot allowing continued limited longitudinal movement of the pull bar on the body, and means for connecting the pull bar to an implement.

2. A hitch for connecting a farm implement to a tractor comprising, a guide body, a pull bar slidably mounted in said body having an opening therein and a longitudinally extending slot directly in rear of said opening, said opening having abrupt walls, a pair of clamping jaws rockably mounted on said body adapted in one position of the pull bar to engage in the opening, and in another position of the pull bar to engage in the slot, means normally holding the jaws in the opening against swinging movement upon normal operation of the tractor and implement, said means being releasable upon an abnormal pull on the bar, whereby said jaws can separate and spring out of said opening and into the slot, said slot allowing limited longitudinal movement of the pull bar on the body, means for connecting the pull bar to an implement, and means for operating the clutch pedal of the tractor from the pull bar upon continued rearward movement of the pull bar.

3. The combination with an implement to be drawn and a tractor for pulling said implement having a clutch pedal, of a hitch for connecting the implement to the tractor including, a guide body, a pull bar slidably mounted in said body, means for connecting the pull bar to the implement, means connecting the body to the tractor, the pull bar having an opening therein and a slot in longitudinal alinement with said opening, a pair of pivoted jaws adapted to engage in the opening under normal conditions, and in the slot under abnormal plowing conditions, means normally holding the jaws toward one another and in a clamping position and against separation under normal plowing conditions, a pull rod pivotally connected to the pull bar, having a group of ratchet teeth therein and a group of teeth provided with abrupt walls, a securing hand lever, a cable connecting the hand lever with the clutch pedal, a spring-pressed dog carried by the hand lever for engaging the groups of teeth at different times, and a hand grip for manually manipulating the dog.

FRANCIS O'KEANE.